United States Patent
Ma et al.

(10) Patent No.: US 6,691,219 B2
(45) Date of Patent: Feb. 10, 2004

(54) METHOD AND APPARATUS FOR 24-BIT MEMORY ADDRESSING IN MICROCONTROLLERS

(75) Inventors: Edward Tangkwai Ma, Plano, TX (US); Frank V. Taylor, III, Highland Village, TX (US); Stephen N. Grider, Argyle, TX (US); Wendell L. Little, deceased, late of Corinth, TX (US), Ann Little, legal representative

(73) Assignee: Dallas Semiconductor Corporation, Dallas, TX (US)

( * ) Notice: Subject to any disclaimer, the term of this patent is extended or adjusted under 35 U.S.C. 154(b) by 194 days.

(21) Appl. No.: 09/924,249

(22) Filed: Aug. 7, 2001

(65) Prior Publication Data

US 2002/0156991 A1 Oct. 24, 2002

Related U.S. Application Data

(60) Provisional application No. 60/223,176, filed on Aug. 7, 2000, and provisional application No. 60/223,668, filed on Aug. 7, 2000.

(51) Int. Cl.⁷ .............................................. G06F 12/00
(52) U.S. Cl. ......................... 711/219; 711/212; 712/32
(58) Field of Search ............................... 711/171, 212, 711/219; 712/32

(56) References Cited

U.S. PATENT DOCUMENTS 5,659,703 A * 8/1997 Moore et al. ............... 711/109
6,502,181 B1 * 12/2002 MacKenna et al. ............ 712/32

* cited by examiner

*Primary Examiner*—Reginald G. Bragdon
*Assistant Examiner*—Pierre M. Vital
(74) *Attorney, Agent, or Firm*—Jenkens & Gilchrist A Profesional Corporation

(57) ABSTRACT

The present invention provides an 8-bit microcontroller capable of supporting expanded addressing capability in one of three address modes. The microcontroller operates in either the traditional 16-bit address mode, a 24-bit paged address mode or in a 24-bit contiguous address mode based on the setting of a new Address Control (ACON) Special Function Register (SFR). The 24-bit paged address mode is binary code compliant with traditional compilers for the standard 16-bit address range, but allows for up to 16M bytes of program memory and 16M bytes of data memory to be supported via a new Address Page (AP) SFR, a new first extended data pointer (DPX) SFR and a new second extended data pointer (DPX1) register. The 24-bit contiguous mode requires a 24-bit address compiler that supports contiguous program flow over the entire 24-bit address range via the addition of an operand and/or cycles to either basic instructions.

56 Claims, 10 Drawing Sheets

METHOD AND APPARATUS FOR 24-BIT MEMORY ADDRESSING IN MICROCONTROLLERS

CROSS-REFERENCE TO RELATED APPLICATIONS

This Nonprovisional Application for Patent claims the benefit of priority from, and hereby incorporates by reference the entire disclosure of, now abandoned U.S. Provisional Application for Patent Serial No. 60/223,176, filed on Aug. 7, 2000, and now abandoned U.S. Provisional Application for Patent Serial No. 60/223,668, also filed on Aug. 7, 2000.

BACKGROUND OF THE INVENTION

1. Technical Field of the Invention

The present invention relates generally to integrated circuit devices and, more particularly, to microcontrollers.

2. Description of Related Art

Processing units of electronic devices may be broadly divided into two categories: (i) processors used as central processing units (CPUs) of (e.g., personal) computers and (ii) embedded processors (a.k.a. microcontrollers, microprocessors, etc.) (e.g., processors operating in cars, microwaves, wireless phones, industrial equipment, televisions, other consumer electronic devices, etc.). Although CPUs are more well-known than microcontrollers, CPU's are actually only responsible for less than 1% of all processors sold, while microcontrollers are responsible for greater than 99% of all processors sold. Consequently, significant time and money is expended for research and development to improve the efficiency, speed, security, feature set, etc. of microcontrollers.

One type of microcontroller is an 8-bit microcontroller, of which the 8051 microcontroller is one example. The term "8051" hereinafter includes any microcontroller that executes at least a substantial portion of the well-known 8051 instruction set. Such 8-bit microcontrollers are used extensively in products today because of their small size, low power consumption, and flexibility. In addition, since the market for 8-bit microcontrollers continues to grow, silicon manufacturers are pushing the development of faster, more efficient 8-bit microcontrollers.

High-Speed 8051 Microcontrollers are a family of 8051-compatible microcontrollers providing increased performance compared to the traditional 8051 family. High-Speed 8051 Micros are 100% instruction set and object code compatible with the Intel 8051 core. To make faster 8051 microcontrollers, designers have implemented more efficient code, faster clocks, and circuits to handle the faster speeds. However, even with the increased speed, many programmers are now demanding that 8051 microcontrollers also support high-level language programming, such as C and C++.

In order to support high-level language programming, more memory and expanded addressing capability are required. Currently, 8051 microcontrollers use 16-bit addressing with 64 K bytes of memory. In order to increase the addressing up to 24-bits with 16M bytes of memory, other designers have increased the internal data bus to 16-bits and extensively modified the 8051 instruction set to accommodate a larger internal bus. However, the new "16-bit" microcontrollers are expensive due to the increased silicon area and circuitry involved in supporting a 16-bit internal bus. In addition, since the new "16-bit" microcontrollers use a modified instruction set, the software must be re-compiled to run on the "16-bit" microcontroller, and the user must learn the new modified instruction set. Furthermore, 16-bit microcontrollers consume more power than 8-bit microcontrollers. Therefore, there is a need for an 8-bit microcontroller with expanded addressing capability.

SUMMARY OF THE INVENTION

The deficiencies of the prior art are overcome by the methods, systems, and arrangements of the present invention. The present invention provides an 8-bit microcontroller with an 8-bit internal bus capable of supporting expanded addressing capability in one of three address modes. Specifically, the microcontroller operates in either the traditional 16-bit address mode, a 24-bit paged address mode or in a 24-bit contiguous address mode based on the setting of a new Address Control (ACON) Special Function Register (SFR). The 24-bit paged address mode is binary code compliant with traditional compilers for the standard 16-bit address range, but allows for up to 16 M bytes of program memory and 16 M bytes of data memory to be supported via a new Address Page (AP) Special Function Register (SFR), a new first extended data pointer (DPX) Special Function Register and a new second extended data pointer (DPX1) Special Function Register. The 24-bit contiguous mode requires a 24-bit address compiler that supports contiguous program flow over the entire 24-bit address range via the addition of an operand and/or cycles to eight basic instructions.

In embodiments of the present invention, in the 24-bit paged mode, the upper third byte of the Program Counter is not incremented when the lower 16 bits in the lower two bytes of the Program Counter roll over from FFFFh to 0000h. Thus, in the 24-bit paged address mode, the third byte of the Program Counter functions only as a storage register which is loaded by the AP register whenever the processor executes an instruction. Similarly, for addressing data memory, the logic value in the upper third byte of the data pointer register is not incremented or decremented when the lower 16 bits in the lower two bytes of the selected data pointer are overflowed or underflowed. Furthermore, execution of program counter or data pointer related instructions in the paged address mode is limited to the 64 K byte page that is pointed to by the current contents of the upper third byte of the program counter or data pointer register.

In further embodiments of the present invention, the 24-bit contiguous address mode is supported by a full 24-bit Program Counter and 24-bit data pointer with a limited set of eight modified instructions that operate in the 24-bit address range. All instruction opcodes retain identical binary compatibility to the 8051 instruction set, and the modified instructions are only different with respect to their cycle and/or byte/operand count.

In still further embodiments of the present invention, an extended program stack is provided that is capable of addressing up to 1 K bytes of stack memory with a programmable option. In a first stack option, an 8-bit Stack Pointer addresses a stack size of 256 bytes that is located in the Scratchpad RAM area. In a second stack option, a 10-bit Stack Pointer addresses the extended 1K program stack located in the internal data memory area.

BRIEF DESCRIPTION OF THE DRAWINGS

A more complete understanding of the methods, systems, and arrangements of the present invention may be had by reference to the following detailed description when taken in conjunction with the accompanying drawings, wherein.

DETAILED DESCRIPTION OF THE EXEMPLARY EMBODIMENTS

The numerous innovative features of the present application will be described with particular reference to the exemplary embodiments. However, it should be understood that this class of embodiments provides only a few examples of the many advantageous uses of the innovative teachings herein. In general, statements made in the specification do not necessarily delimit any of the various aspects of the claimed invention. Moreover, some statements may apply to some inventive features, but not to others.

Figure 1A:
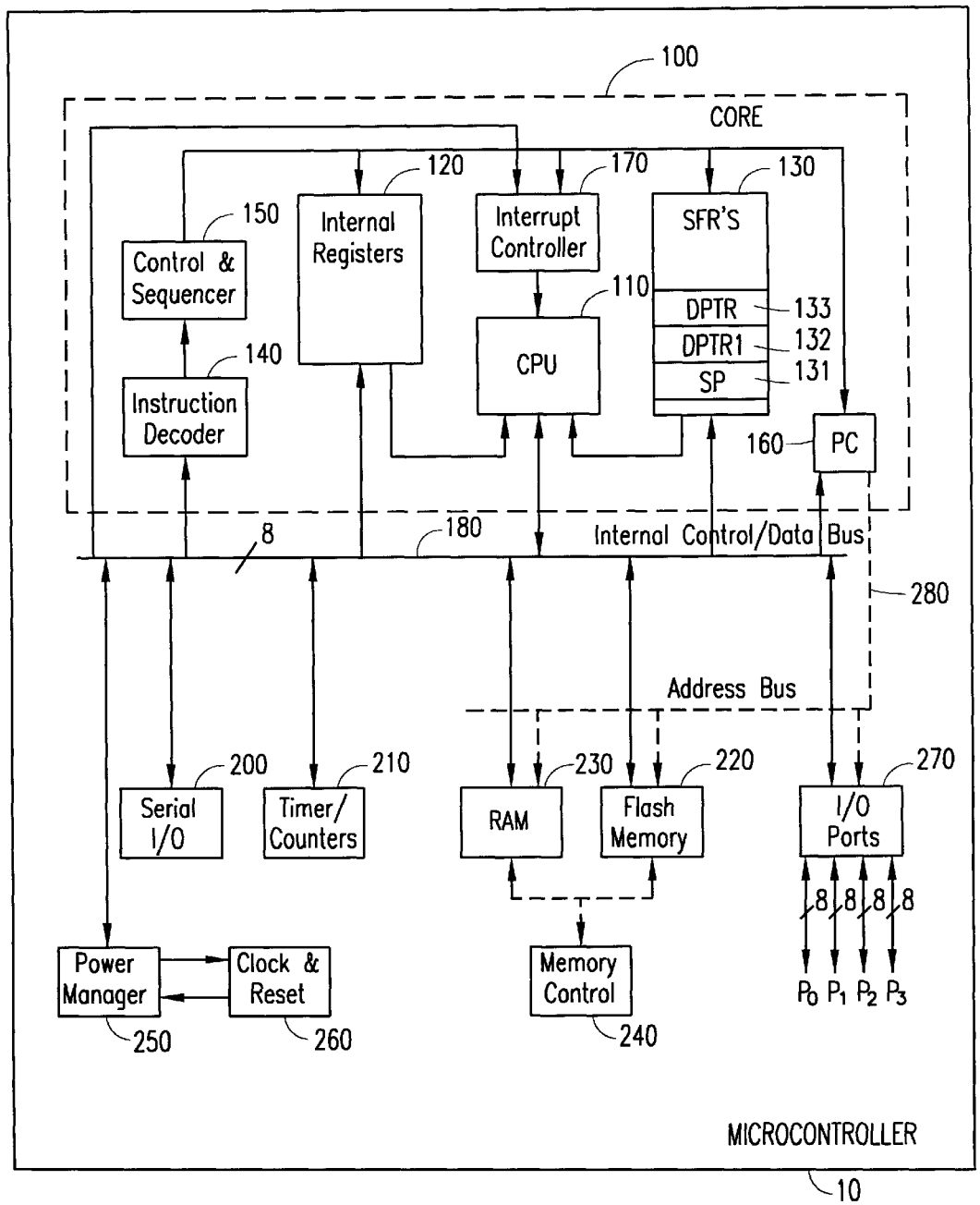
FIG. 1A is a functional block diagram of an 8-bit microcontroller of the type used in exemplary embodiments of the present invention.

Referring now to FIG. 1A, there is illustrated a functional block diagram of an 8051 compatible microcontroller 10 of the type used in exemplary embodiments of the present invention. However, it should be understood that the 8051 microcontroller is discussed merely for exemplary purposes, and that the concepts described herein may be applied to any 8-bit microcontroller. The microprocessor core 100 contains a CPU 110, Internal Registers 120, Special Function Registers 130, an Instruction Decoder 140, a Control and Sequencer 150, a Program Counter 160, an Interrupt Controller 170, and an 8-bit internal control/data bus 180. The elements are placed into communication with each other as shown in FIG. 1A.

The Internal Registers 120 include a scratchpad register area having four 8-byte banks of working registers. Sixteen bytes of the scratchpad area, which may also be used as a program stack, as discussed in more detail hereinbelow in connection with FIG. 4, are bit addressable. The Special Function Registers 130 control the on-chip peripherals and memory configurations and are preferably accessed via direct addressing but could be addressed via indirect addressing.

The Flash Memory 220 contains 16 K bytes of on-chip Flash memory for program storage. The RAM 230 contains 1 K bytes of on-chip RAM for data memory. It should be noted that all of the registers 120 and 130 are located on-chip, but the program 220 and data memory 230 space can be either on-chip, off-chip, or both for a maximum of 16 M bytes for each of the program 220 and data 230 memories. The Memory Control 240 provides access controls for internal and external memory and supports Flash memory 220 reprogramming.

The two data pointers DPTR 133 and DPTR1 132 support fast data movement in data memory. Each data pointer 133 and 132 contains an 8-bit low data pointer special function register and an 8-bit high data pointer special function register. The Stack Pointer (SP) 131 designates the memory location that is at the top of the program stack. In addition to the 256 bytes of the on-chip Internal Registers 170, a separate 1 K bytes of RAM 230 in data memory may also be used as the program stack. The Program Counter (PC) 160 contains the Address Register (AR) as well as the increment logic to address the program 220 and data memory 230 via the 24-bit Address Bus 280.

The Instruction Decoder 140 contains the Instruction Register and decode logic that generates most of the control signals for each instruction. The Control and Sequencer 150 provides logic control and operation sequencing for the core. The Interrupt Controller 170 contains the control logic that detects and services all incoming interrupts to the microcontroller.

An 8-bit Internal Control/Data bus 180 is used to connect the microcontroller core 100 to the various other parts of the microcontroller. The Serial I/O 200 supports serial communication and provides two fully independent UARTs, not shown, for simultaneous communication over two channels. The I/O Ports 270 P0–P3 are composed of parallel bi-directional pins for external memory access and external interrupts and can either be written to or read from.

The Power Manager 250 incorporates a band-gap reference and analog circuitry to monitor the power supply conditions and also a Watchdog Timer. The Clock and Reset 260 contains the reset control logic and the clock control register, and generates the system clocks for core logic and the peripheral clocks for the external interface. The Timer/Counters 210 block includes three timers as well as the necessary control logic for the timers.

Figure 1B:
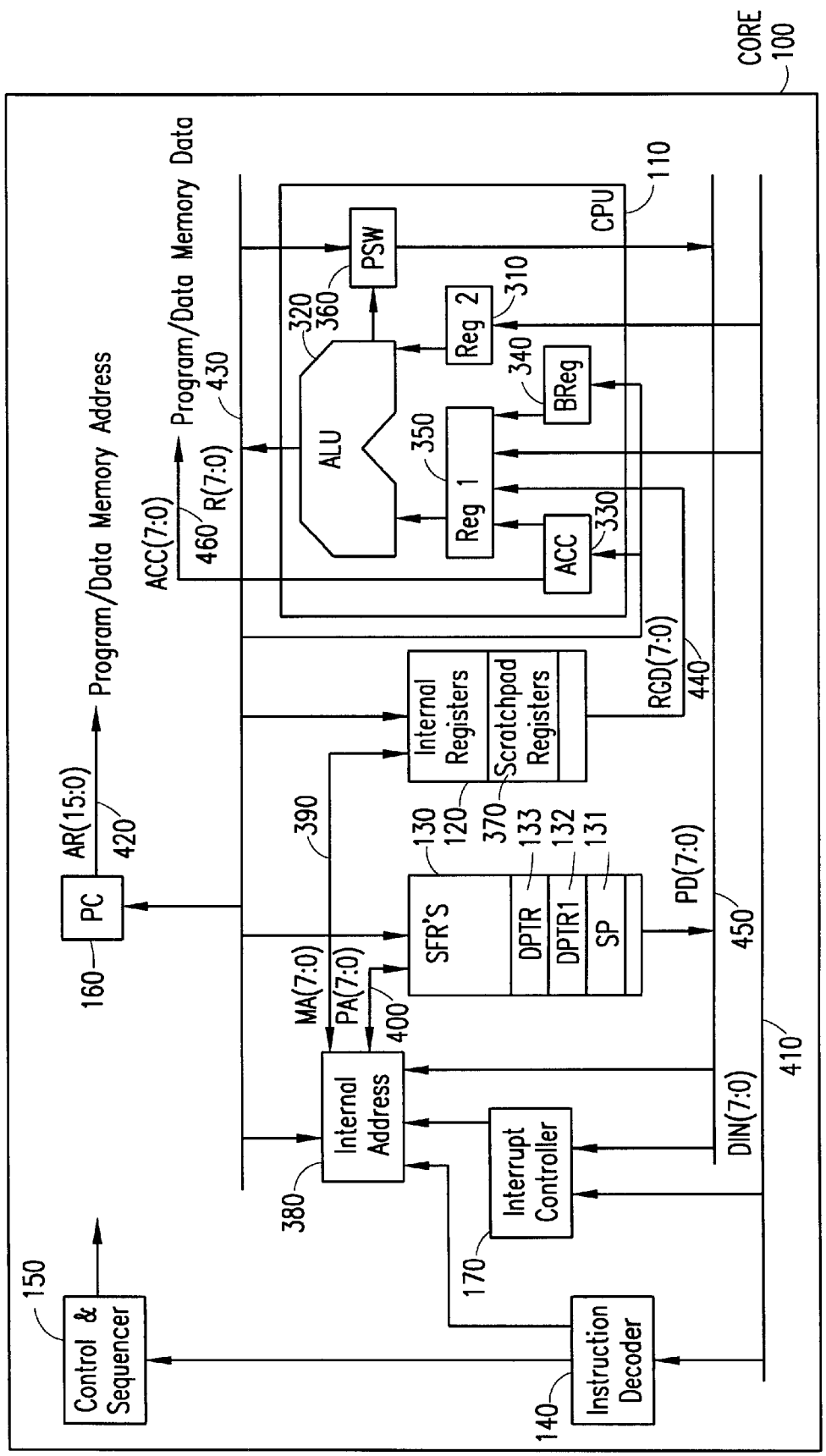
FIG. 1B is functional block diagram of the Core of the microcontroller of FIG. 1A.

Referring now to FIG. 1B, there is illustrated a functional block diagram of an exemplary Core 100 of FIG. 1A. The CPU 110 is code compatible with a standard 8051 microprocessor's code instructions. The Core 100 shown in FIG. 1B is capable of executing its fastest instruction in one clock cycle at 40 MHZ. However, it should be understood that the core 100 may be capable of operating at other speeds. The instruction is fetched and sent over the DIN(7:0) 410 internal data bus to Register 2 (Reg 2) 310 of the ALU execution unit 320. The ALU 320 performs math and logical operations, and makes comparisons and general decisions.

The Accumulator 330 (ACC) is the primary register used in the CPU 110 and is the source or destination of most operations. The B Register 340 is used as the second 8-bit argument in multiply and divide operations and can also be used as a general purpose register. The Program Status Word (PSW) 360 contains several flags including the Carry Flag, the Auxiliary Carry Flag, the General Purpose Flag, the Register Bank Selection bits, the Overflow Flag, and the Parity Flag.

Working in cooperation with the CPU 110 are various other functional devices. The Scratchpad Registers 370 within the Internal Registers 120 is a RAM containing 256 registers available for general purpose data storage. The program stack, which is accessible by the Stack Pointer 131, may be located anywhere in the 256 bytes of RAM in the Scratchpad Registers 370 or in the data memory RAM 230, as discussed below in connection with FIGS. 5–7.

There are shown three internal address buses and five internal data buses in the Core 100 logic for connecting the various functional devices. However, it should be understood that greater or fewer buses may be within the Core 100. The AR(15:0) address bus 420 provides addresses for opcode/operand fetching and data memory read/write operations. The MA(7:0) address bus 390 is a split read/write address bus for the dual-port Internal Address 380 data RAM and supports simultaneous read and write operations for the Internal Registers 120. The PA(7:0) address bus 400 provides the read/write addresses for SFRs 130.

The DIN(7:0) 410 is the main data bus in the core and is used for instruction fetches from the program memory and data read from the data memory. The ACC(7:0) 460 is the Accumulator data bus from the Core 100 and is primarily used for writing data to the data memory and program memory. The R(7:0) 430 is the data input bus for all internal registers and is used for output of all ALU 320 operations to the Scratchpad Registers 370 and the SFRs 130. The RGD (7:0) 440 is the data output bus for the Scratchpad Registers 370, allowing the Scratchpad Registers 370 to feed instructions via the RGD(7:0) 440 to Register 1 (Reg 1) 350 of the ALU execution unit 320. The PD(7:0) 450 is the data output bus for the SFRs 130, allowing the SFRs 130 to feed instructions via the PD(7:0) 450 to Register 1 (Reg 1) 350 of the ALU execution unit 320.

All peripherals and operations that are not explicit instructions are controlled via Special Function Registers (SFRs) 130. The common features that are basic to the architecture of the microcontroller are mapped to the SFRs 130. These include the CPU registers (ACC 330, B Reg 340, and PSW 360), the dual data pointers (DPTR 133 and DPTR1 132), the stack pointer (SP) 131, the I/O Ports 270 (shown in FIG. 1), the Timer/Counters 210 (shown in FIG. 1), and the serial ports 200 (shown in FIG. 1).

The data pointers (DPTR 133 and DPTR1 132) are used to assign a memory address for the MOVX instructions in the 8051 instruction set. This address can point to either a RAM location (on or off laze chip) or to a memory mapped peripheral. The two data pointers 133 and 132 are also useful when moving data from one memory area to another, or when using a memory mapped peripheral for both source and destination addresses. The user can select the active pointer using a dedicated SFR bit or can activate an automatic toggling feature for altering the pointer selection when certain instructions using the data pointer are executed.

The standard SFR locations known in 8051 style microcontrollers are duplicated in this exemplary embodiment. In addition, several SFRs have been added to support the unique features of the present invention. Most of these features are controlled by bits in SFRs located in unused locations in the 8051 SFR map. This allows for increased functionality while maintaining 8051 instruction set compatibility.

Figure 2A:
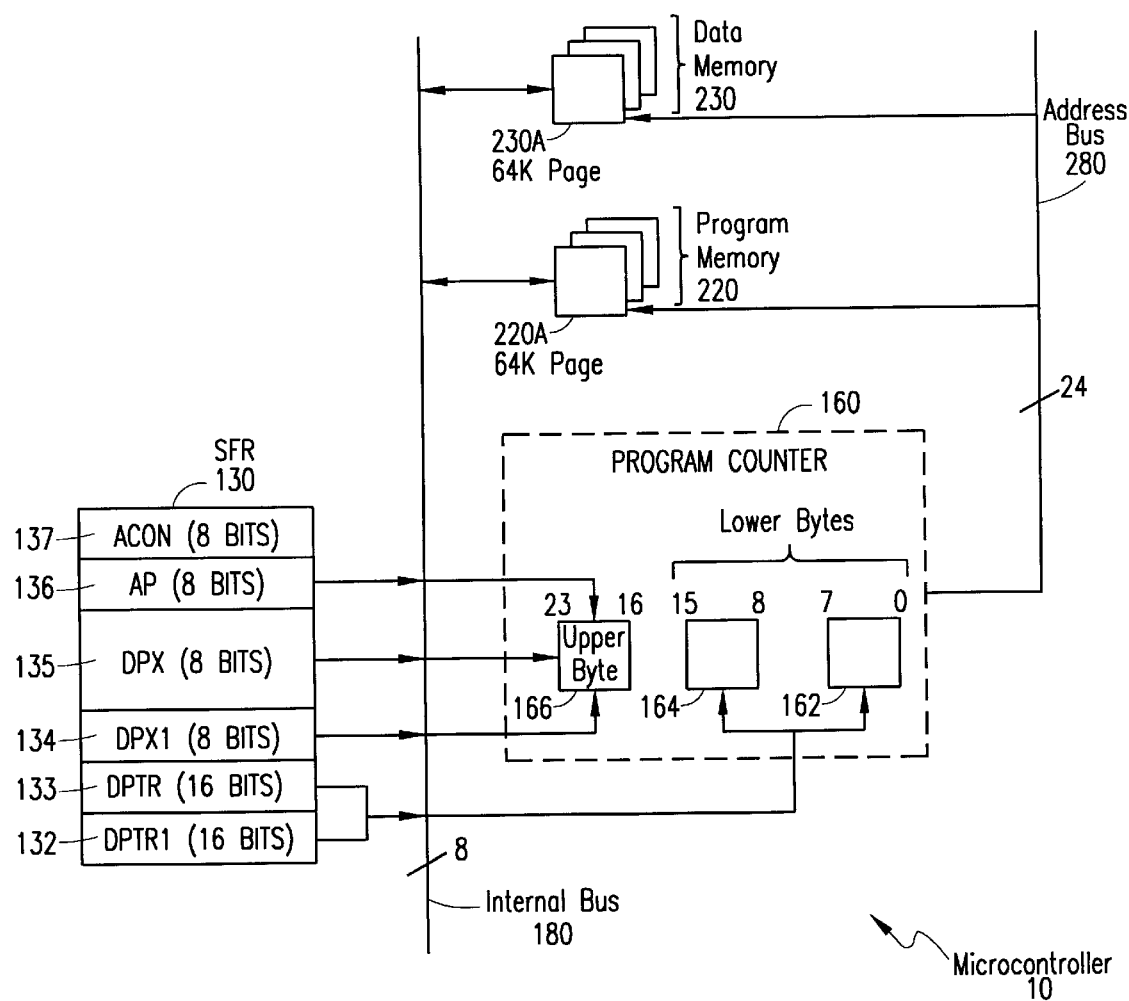
FIG. 2A is a functional block diagram illustrating 24-bit addressing in page mode, in accordance with exemplary embodiments of the present invention.

Referring now to FIG. 2A, there is illustrated some of the additional SFRs 130 applicable to the present invention. Two additional extended Data Pointers DPTR's (DPX) 135 and (DPX1 ) 134 have been added to support 24-bit data addressing to the data memory 230. In addition, a new Address Page (AP) register 136 that supports an internal bank switch mechanism has been added to provide 24-bit program addressing to the program memory 220. 133 Furthermore, a new Address Control (ACON) register 137 has been added to allow the 8051 compatible microcontroller 10 to operate in either the traditional 16-bit address mode, a 24-bit paged address mode or in a 24-bit contiguous address mode. The AP register 136, DPX register 135 and DPX1 register 134 are all 8-bit registers that provide the hardware support for 24-bit addressing in the paged address mode. The 24-bit contiguous mode will be described in more detail hereinbelow in connection with FIG. 2B of the drawings.

Use of the 24-bit paged address mode is binary code compliant with the traditional compilers for the standard 16-bit address range, but allows for up to 16 M bytes of program memory 220 and 16M bytes of data memory 230 to be supported via the new AP register 136 and the new extended data pointer registers (DPX 135 and DPX1 134). When the microcontroller 10 is programmed to operate in the page address mode via the ACON register 137, all instructions maintain identical binary code compatibility with the traditional 16-bit mode.

The only difference found in executing code in the traditional 16-bit mode and the 24-bit paged mode is the addition of one machine cycle when the hardware executes the ACALL, LCALL, RET and RET1 instructions, as well as when the hardware processes an interrupt. The addition of one machine cycle is the time required to handle the pushing of the additional 8 bits (associated with the extension of the basic 16-bit address to 24-bit addressing) to the Program Stack.

In the 24-bit paged address mode, the upper byte 166 of the Program Counter 160 (PC[23:16]) is not incremented when the lower 16 bits in the lower two bytes 164 and 162 of the Program Counter 160 (PC[15:0]) roll over from FFFFh to 0000h. In the 24-bit paged address mode, the upper byte 166 of the Program Counter 160 PC[23:16] functions only as a storage register that is loaded by the Address Page (AP) register 136 via the Internal bus 180 whenever the microcontroller 10 executes an instruction, such as LCALL or LJMP.

For example, execution of the LCALL or LJMP instruction loads the contents of the AP register 136 into the upper byte 166 of the Program Counter 160 (PC23:16) to allow the Program Counter 160 to drive address lines A23-A16 166 with the previous AP 136 value at the same time as the Program Counter 160 updates (increments or decrements) address lines A15-A0 164 and 162. In this manner, software compiled using the standard 16-bit addressing scheme uses the contents of the AP register 136 to establish the page 220A to which the program flow is to jump. The AP register 136 can be loaded at any time prior to the execution of the LCALL or LJMP instruction to establish the address vector to be used when the LCALL or LJMP instruction crosses page boundaries.

Therefore, the upper byte 166 of the Program Counter 160 identifies the 64K page 220A of program memory 220 that is read from/written to via the 24-bit address bus 280. With the 24-bit paged address mode, the 16 M byte program memory 220 is divided into 256 pages 220A, each being separately addressable by the AP register 136. The specific page 220A that the programmer needs to access is manually written to the AP register 136 before an instruction. Thus, when the instruction is received, and the contents of the AP 136 are loaded into the upper byte 166 of the Program Counter 160, the correct page 220A of program memory 220 is accessed during execution of the instruction.

By manually writing the upper byte 166 of the Program Counter 160 to the AP register 136, the 24-bit paged addressing mode can be used with existing compilers and assemblers that work within the 16-bit address space. Internally, the full 24-bit address is used to access the program memory 220. However, once the correct page 220A is identified by loading the contents of the AP 136 into the upper byte 166 of the Program Counter 160, as discussed above, the compiler only increments and decrements the lower two bytes 164 and 162 of the Program Counter 160 to access program memory locations within the identified 64K page 220A.

Execution of DPTR related instructions in the paged address mode is also limited to the 64 K byte page 230A that is pointed to by the current contents of the selected extended DPTR register (DPX 135 or DPX1 134). As with the 24-bit page program memory addressing, the logic value in the extended DPTR register DPX 135 or DPX1 134 is not incremented or decremented when the lower 16 bits in the lower two bytes of the selected DPTR 133 or 132 are overflowed or underflowed.

However, instead of loading only the AP register 136 when accessing the program memory 220, as discussed above, the contents of the DPTR 133 or DPTR1 132 are also loaded into the lower bytes 164 and 162 of the Program Counter 160, in addition to loading the contents of the DPX 135 or DPX1 134 into the upper byte 166 of the Program Counter 160, to access the data memory 230. Thus, to access data memory 230 in 24-bit paged mode, the data pointer itself (DPTR 133 or DPTR1 132 in combination with DPX 135 or DPX1 134) is written to, whereas to access program memory 220 in 24-bit paged mode, the programmer writes to the AP 136 (not directly to the actual high byte 166 of the Program Counter 160). It should be understood that there may be other ways of accessing the data memory 230 using the data pointers DPTR 133 and DPX 135, rather than using the Program Counter 160, as described above.

In addition, it should be noted that the execution of either the JMP@A+DPTR or the MOVC A, @A+DPTR instruction is limited to the current 64K-byte page 230A range specified by the upper byte of the Program Counter 160 (PC[23:16]). The contents in the DPX 135 or DPX1 134 registers do not affect the execution of these instructions.

The modifications to the instructions in the paged address mode are summarized in the following tables.

TABLE 1

Paged Mode Modified ACALL Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| ACALL addr11 | a10 | a9 | a8 | 1 | 0 | 0 | 0 | 1 | Byte 1 | 2 | 3 | (PC) = (PC) + 2 |
|  | a7 | a6 | a5 | a4 | a3 | a2 | a1 | a0 | Byte 2 | | | (SP) = (SP) + 1 |
|  | | | | | | | | | | | | ((SP)) = (PC7:0) |
|  | | | | | | | | | | | | (SP) = (SP) + 1 |
|  | | | | | | | | | | | | ((SP)) = (PC15:8) |
|  | | | | | | | | | | | | (PC10:0) = ADDR11 |
| *24-bit paged mode* | | | | | | | | | | | | |
| ACALL addr11 | a10 | a9 | a8 | 1 | 0 | 0 | 0 | 1 | Byte 1 | 2 | 4 | (PC) = (PC) + 2 |
|  | a7 | a6 | a5 | a4 | a3 | a2 | a1 | a0 | Byte 2 | | | (SP) = (SP) + 1 |
|  | | | | | | | | | | | | ((SP)) = (PC7:0) |
|  | | | | | | | | | | | | (SP) = (SP) + 1 |
|  | | | | | | | | | | | | ((SP)) = (PC15:8) |
|  | | | | | | | | | | | | (SP) = (SP) + 1 |
|  | | | | | | | | | | | | ((SP)) = (PC23:16) |
|  | | | | | | | | | | | | (PC10:0) = ADDR11 |

TABLE 2

Paged Mode Modified LCALL Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| LCALL addr16 | 0 | 0 | 0 | 1 | 0 | 0 | 1 | 0 | 12 | 3 | 4 | (PC) = (PC) + 3 |
|  | a15 | a14 | a13 | a12 | a11 | a10 | a9 | a8 | Byte 2 | | | (SP) = (SP) + 1 |
|  | a7 | a6 | a5 | a4 | a3 | a2 | a1 | a0 | Byte 3 | | | ((SP)) = (PC7:0) |
|  | | | | | | | | | | | | (SP) = (SP) + 1 |
|  | | | | | | | | | | | | ((SP)) = (PC15:8) |
|  | | | | | | | | | | | | (PC) = addr16 |
| *24-bit paged mode* | | | | | | | | | | | | |
| LCALL addr16 | 0 | 0 | 0 | 1 | 0 | 0 | 1 | 0 | 12 | 3 | 5 | (PC) = (PC) + 3 |
|  | a15 | a14 | a13 | a12 | a11 | a10 | a9 | a8 | Byte 2 | | | (SP) = (SP) + 1 |
|  | a7 | a6 | a5 | a4 | a3 | a2 | a1 | a0 | Byte 3 | | | ((SP)) = (PC7:0) |
|  | | | | | | | | | | | | (SP) = (SP) + 1 |
|  | | | | | | | | | | | | ((SP)) = (PC15:8) |
|  | | | | | | | | | | | | (SP) = (SP) + 1 |
|  | | | | | | | | | | | | ((SP)) = (PC23:16) |
|  | | | | | | | | | | | | (PC10:0) = addr16 |
|  | | | | | | | | | | | | (PC23:16) = (AP7:0) |

TABLE 3

Paged Mode Modified RET Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| RET | 0 | 0 | 1 | 0 | 0 | 0 | 1 | 0 | 22 | 1 | 4 | (P15:8) = ((SP))<br>(SP) = (SP) − 1<br>(PC7:0) = ((SP))<br>(SP) = (SP) − |
| *24-bit paged mode* | | | | | | | | | | | | |
| RET | 0 | 0 | 1 | 0 | 0 | 0 | 1 | 0 | 22 | 1 | 5 | (PC23:16) = ((SP))<br>(SP) + (SP) −<br>(PC15:8) = ((SP))<br>(SP) = (SP) −<br>(PC7:0) = ((SP))<br>(SP) = (SP) − |

TABLE 4

Paged Mode Modified RET1 Instructions (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| RET1 | 0 | 0 | 1 | 1 | 0 | 0 | 1 | 0 | 32 | 1 | 4 | (PC15:8) = ((SP))<br>(SP) = (SP) −<br>(PC7:0) = ((SP))<br>(SP) = (SP) − |
| *24-bit mode* | | | | | | | | | | | | |
| RET1 | 0 | 0 | 1 | 1 | 0 | 0 | 1 | 0 | 32 | 1 | 5 | (PC23:9) = ((SP))<br>(SP) = (SP) −<br>(PC15:8) = ((SP))<br>(SP) = (SP) −<br>(PC7:0) = ((SP))<br>(SP) = (SP) − |

As can be seen in Tables 1–4, no extra bytes are added to any of the instructions. Thus, no additional compilers are required while addressing in paged mode. However, due to the addition of an upper address byte, an extra clock cycle is needed to load the upper byte onto the program stack, which will be described in more detail hereinbelow in connection with FIGS. 5–7.

Figure 2B:
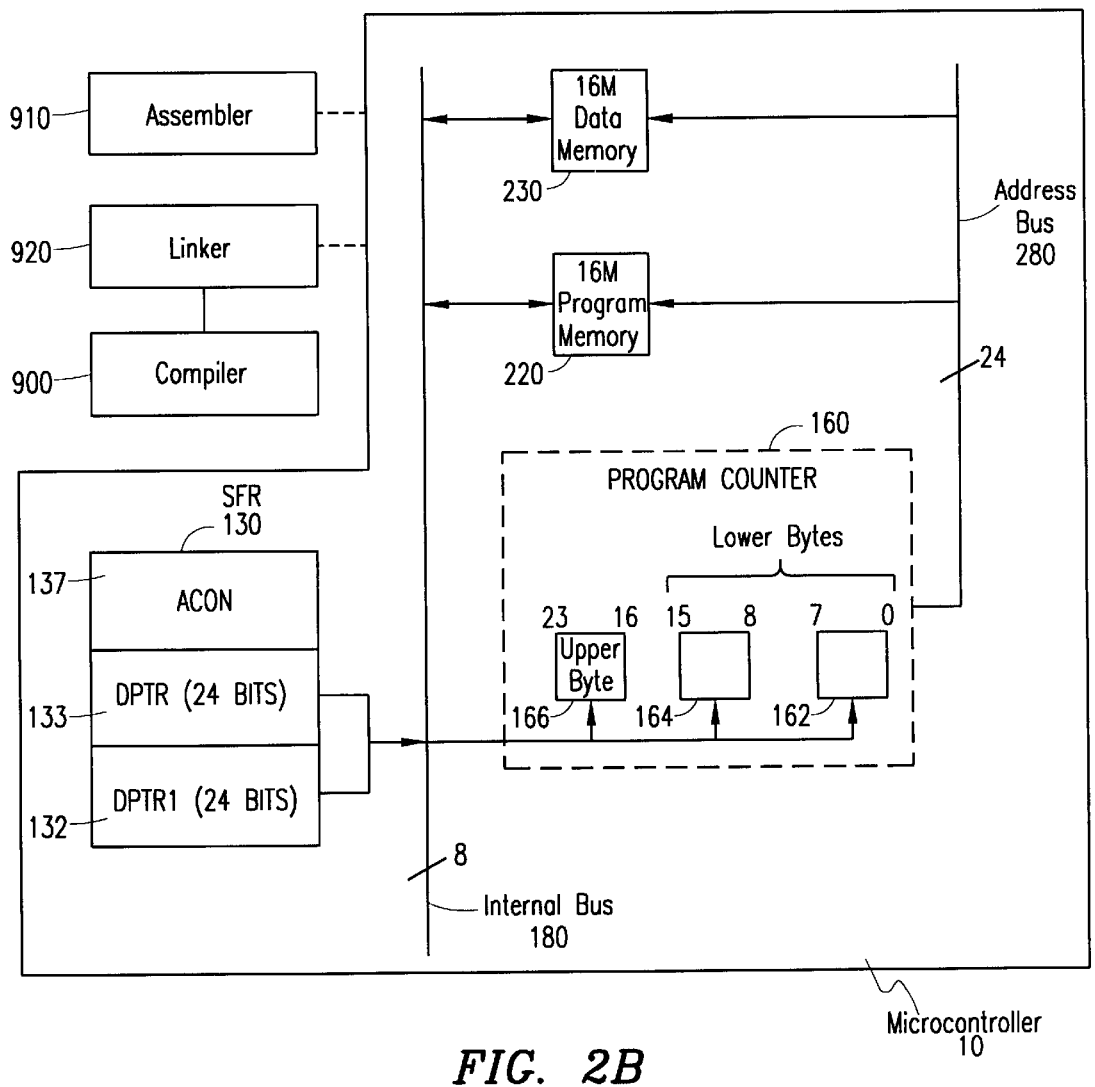
FIG. 2B is a functional block diagram illustrating 24-bit addressing in contiguous mode, in accordance with exemplary embodiments of the present invention.

Referring now to FIG. 2B, when the ACON register 137 is set to 24-bit contiguous mode, the microcontroller 10 operates in a full 24-bit address mode. The 24-bit contiguous addressing mode is supported by a full 24-bit Program Counter 160 with a limited set of eight modified instructions that allow access to the full 24-bit program memory 220 range. In addition, the 24-bit DPTR 133 and DPTR1 132 registers function identically to the Program Counter 160 to allow access to the full 24-bit data memory 230 range. It should be noted that all modified instructions that utilize the DPTR register 133 make use of a full 24-bit DPTR register 133, including the DPX and DPX1 registers shown in FIG. 2A (DPTR=DPX+DPH+DPL and DPTR1=DPX1+DPH1+DPL1). However, for convenience, the DPX and DPX1 registers are not specifically shown in FIG. 2B.

The 24-bit contiguous mode may also require a 24-bit address compiler 900 that supports contiguous program flow over the entire 24-bit address range using the eight modified instructions. It should be noted that all of the instruction opcodes retain identical binary compatibility to the 8051. Modified instructions are only different with respect to their cycle and/or byte/operand count. Furthermore, all modified calling instructions automatically store and restore the entire contents of the 24-bit Program Counter 160.

In addition to a new Compiler 900, the 24-bit contiguous address mode may further require new Assembler 910 and Linker 920 support. As is understood in the art, a Compiler 900 translates programs created in a high level language (such as C or C++) into Assembly for a target machine. As is further understood in the art, the Assembler 910 is used when a program is developed using Assembly language directly. The Assembler converts the program into binary code to be programmed into the program memory 220. As is also understood in the art, the Linker 920 links together the resulting program codes generated by the Compiler 900 with other special utility programs to form the final program code. The Linker 910 also performs a final translation that converts the program code into binary code to be programmed into the program memory 220. Therefore, in addition to a new Compiler 900, a new Assembler 910 and Linker 920 may also be required to support contiguous program flow over the entire 24-bit address range.

The modifications to the instructions in the 24-bit contiguous address mode are summarized in the following tables.

TABLE 5

24-Bit Contiguous Mode Modified ACALL Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| ACALL addr11 | a10 | a9 | a8 | 1 | 0 | 0 | 0 | 1 | | Byte 1 | 2 | 3 | (PC) = (PC) + 2 |
| | a7 | a6 | a5 | a4 | a3 | a2 | a1 | a0 | | Byte 2 | | | (SP) = (SP) + 1 |
| | | | | | | | | | | | | | ((SP)) = (PC7:0) |
| | | | | | | | | | | | | | (SP) = (SP) + 1 |
| | | | | | | | | | | | | | ((SP)) = (PC15:8) |
| | | | | | | | | | | | | | (PC10:0) = addr11 |
| *24-bit contiguous mode* | | | | | | | | | | | | |
| ACALL addr19 | a18 | a17 | a16 | 1 | 0 | 0 | 0 | 1 | | Byte 1 | 3 | 5 | (PC) = (PC) + 3 |
| | a15 | a14 | a13 | a12 | a11 | a10 | a9 | a8 | | Byte 2 | | | (SP) = (SP) + 1 |
| | a7 | a6 | a5 | a4 | a3 | a2 | a1 | a0 | | Byte 3 | | | ((SP)) = (PC7:0) |
| | | | | | | | | | | | | | (SP) = (SP) + 1 |
| | | | | | | | | | | | | | ((SP)) = (PC15:8) |
| | | | | | | | | | | | | | (SP) = (SP) + 1 |
| | | | | | | | | | | | | | ((SP)) = (PC23:16) |
| | | | | | | | | | | | | | (PC10:0) = addr19 |

TABLE 6

24-Bit Contiguous Mode Modified AJMP Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| AJMP addr11 | a10 | a9 | a8 | 1 | 0 | 0 | 0 | 1 | | Byte 1 | 2 | 3 | (PC) = (PC) + 2 |
| | a7 | a6 | a5 | a4 | a3 | a2 | a1 | a0 | | Byte 2 | | | (PC10:0) = addr11 |
| *24-bit contiguous mode* | | | | | | | | | | | | |
| AJMP addr19 | a18 | a17 | a16 | 1 | 0 | 0 | 0 | 1 | | Byte 1 | 3 | 4 | (PC) = (PC) + 3 |
| | a15 | a14 | a13 | a12 | a11 | a10 | a9 | a8 | | Byte 2 | | | (PC10:0) = addr19 |
| | a7 | a6 | a5 | a4 | a3 | a2 | a1 | a0 | | Byte 3 | | | |

TABLE 7

24-Bit Contiguous Mode Modified INC DPTR Instruction (as compared to 16-bit)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| INC DPTR | 1 | 0 | 1 | 0 | 0 | 0 | 1 | 1 | A3 | 1 | 3 | (DPTR) = (DPTR) + 1 |
| *24-bit mode* | | | | | | | | | | | | |
| INC DPTR | 1 | 0 | 1 | 0 | 0 | 0 | 1 | 1 | A3 | 1 | 4 | (DPTR) = (DPTR) + 1 One more cycle to update the DPX register |

TABLE 8

24-Bit Contiguous Mode Modified LCALL Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| *16-bit mode* | | | | | | | | | | | | |
| LCALL addr16 | 0 | 0 | 0 | 1 | 0 | 0 | 1 | 0 | 12 | 3 | 4 | (PC) = (PC) + 3 |
| | a15 | a14 | a13 | a12 | a11 | a10 | a9 | a8 | | Byte 2 | | | (SP) = (SP) + 1 |
| | a7 | a6 | a5 | a4 | a3 | a2 | a1 | a0 | | Byte 3 | | | ((SP)) = (PC7:0) |
| | | | | | | | | | | | | | (SP) = (SP) + 1 |
| | | | | | | | | | | | | | ((SP)) = (PC15:8) |
| | | | | | | | | | | | | | (PC15:0) = addr16 |

TABLE 8-continued

24-Bit Contiguous Mode Modified LCALL Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| | | | | | 24-bit paged mode | | | | | | | |
| LCALL addr24 | 0 | 0 | 0 | 1 | 0 | 0 | 1 | 0 | 12 | 4 | 6 | (PC) = (PC) + 4 |
| | a23 | a22 | a21 | a20 | a19 | a18 | a17 | a16 | | Byte 2 | | (SP) = (SP) + 1 |
| | a15 | a14 | a13 | a12 | a11 | a10 | a9 | a8 | | Byte 3 | | ((SP)) = (PCY:0) |
| | a7 | a6 | a5 | a4 | a3 | a2 | a1 | a0 | | Byte 4 | | (SP) = (SP) + 1 |
| | | | | | | | | | | | | ((SP)) = (PC15:8) |
| | | | | | | | | | | | | (SP) = (SP) + 1 |
| | | | | | | | | | | | | ((SP)) = (PC23:16) |
| | | | | | | | | | | | | (PC23:0) = addr24 |

TABLE 9

24-Bit Contiguous Mode Modified LJMP Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| | | | | | 16-bit mode | | | | | | | |
| LJMP addr16 | 0 | 0 | 0 | 0 | 0 | 0 | 1 | 0 | 02 | 3 | 4 | (PC15:0) = addr16 |
| | a15 | a14 | a13 | a12 | a11 | a10 | a9 | a8 | | Byte 2 | | (PC23:16) = 00h |
| | a7 | a6 | a5 | a4 | a3 | a2 | a1 | a0 | | Byte 3 | | |
| | | | | | 24-bit paged mode | | | | | | | |
| LJMP addr24 | 0 | 0 | 0 | 0 | 0 | 0 | 1 | 0 | 02 | 4 | 5 | (PC23:0) = addr4 |
| | a23 | a22 | a21 | a20 | a19 | a18 | a17 | a16 | | Byte 2 | | |
| | a15 | a14 | a13 | a12 | a11 | a10 | a9 | a8 | | Byte 3 | | |
| | a7 | a6 | a5 | a4 | a3 | a2 | a1 | a0 | | Byte 4 | | |

TABLE 10

24-Bit Contiguous Mode Modified MOV DPTR Instruction (as compared to 16-bit)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| | | | | | 16-bit mode | | | | | | | |
| MOV DPTR, #data16 | 1 | 0 | 0 | 1 | 0 | 0 | 0 | 0 | 90 | 3 | 3 | (DPH) = #data15:8 |
| | d15 | d14 | d13 | d12 | d11 | d10 | d9 | d8 | | Byte 2 | | (DPL) = #data7:0 |
| | d7 | d6 | d5 | d4 | d3 | d2 | d1 | d0 | | Byte 3 | | |
| | | | | | 24-bit contiguous mode | | | | | | | |
| MOV DPTR, #data24 | 1 | 0 | 0 | 1 | 0 | 0 | 0 | 0 | 90 | 4 | 4 | (DPX) = #data23:16 |
| | d23 | d22 | d21 | d20 | d19 | d18 | d17 | d16 | | Byte 2 | | (DPH) = #data15:8 |
| | d15 | d14 | d13 | d12 | d11 | d10 | d9 | d8 | | Byte 3 | | (DPL) = #data7:0 |
| | d7 | d6 | d5 | d4 | d3 | d2 | d1 | d0 | | Byte 4 | | |

TABLE 11

24-Bit Contiguous Mode Modified RET Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| | | | | | 16-bit mode | | | | | | | |
| RET | 0 | 0 | 1 | 0 | 0 | 0 | 1 | 0 | 22 | 1 | 4 | (PC15:8) = ((SP)) |
| | | | | | | | | | | | | (SP) = (SP) − |
| | | | | | | | | | | | | (PC7:0) = ((SP)) |
| | | | | | | | | | | | | (SP) = (SP) − |
| | | | | | 24-bit contiguous mode | | | | | | | |
| RET | 0 | 0 | 1 | 0 | 0 | 0 | 1 | 0 | 22 | 1 | 5 | (PC23:16) = ((SP)) |
| | | | | | | | | | | | | (SP) = (SP) − |
| | | | | | | | | | | | | (PC15:8) = ((SP)) |

TABLE 11-continued

24-Bit Contiguous Mode Modified RET Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| | | | | | | | | | | | | (SP) = (SP) − |
| | | | | | | | | | | | | (PC7:0) = ((SP)) |
| | | | | | | | | | | | | (SP) = (SP) − |

TABLE 12

24-Bit Contiguous Mode Modified RETl Instruction (as compared to 16-bit mode)
Instruction Code

| Instruction | D7 | D6 | D5 | D4 | D3 | D2 | D1 | D0 | Hex | Byte | Cycle | Comments |
|---|---|---|---|---|---|---|---|---|---|---|---|---|
| 16-bit mode | | | | | | | | | | | | |
| RET1 | 0 | 0 | 1 | 1 | 0 | 0 | 1 | 0 | 32 | 1 | 4 | (PC15:8) = ((SP)) |
| | | | | | | | | | | | | (SP) = (SP) − |
| | | | | | | | | | | | | (PC7:0) = ((SP)) |
| | | | | | | | | | | | | (SP) = (SP) − |
| 24-bit contiguous mode | | | | | | | | | | | | |
| RET1 | 0 | 0 | 1 | 1 | 0 | 0 | 1 | 0 | 32 | 1 | 5 | (PC23:16) = ((SP)) |
| | | | | | | | | | | | | (SP) = (SP) − |
| | | | | | | | | | | | | (PC15:8) = ((SP)) |
| | | | | | | | | | | | | (SP) = (SP) − |
| | | | | | | | | | | | | (PC7:0) = ((SP)) |
| | | | | | | | | | | | | (SP) = (SP) − |

Figure 3A:
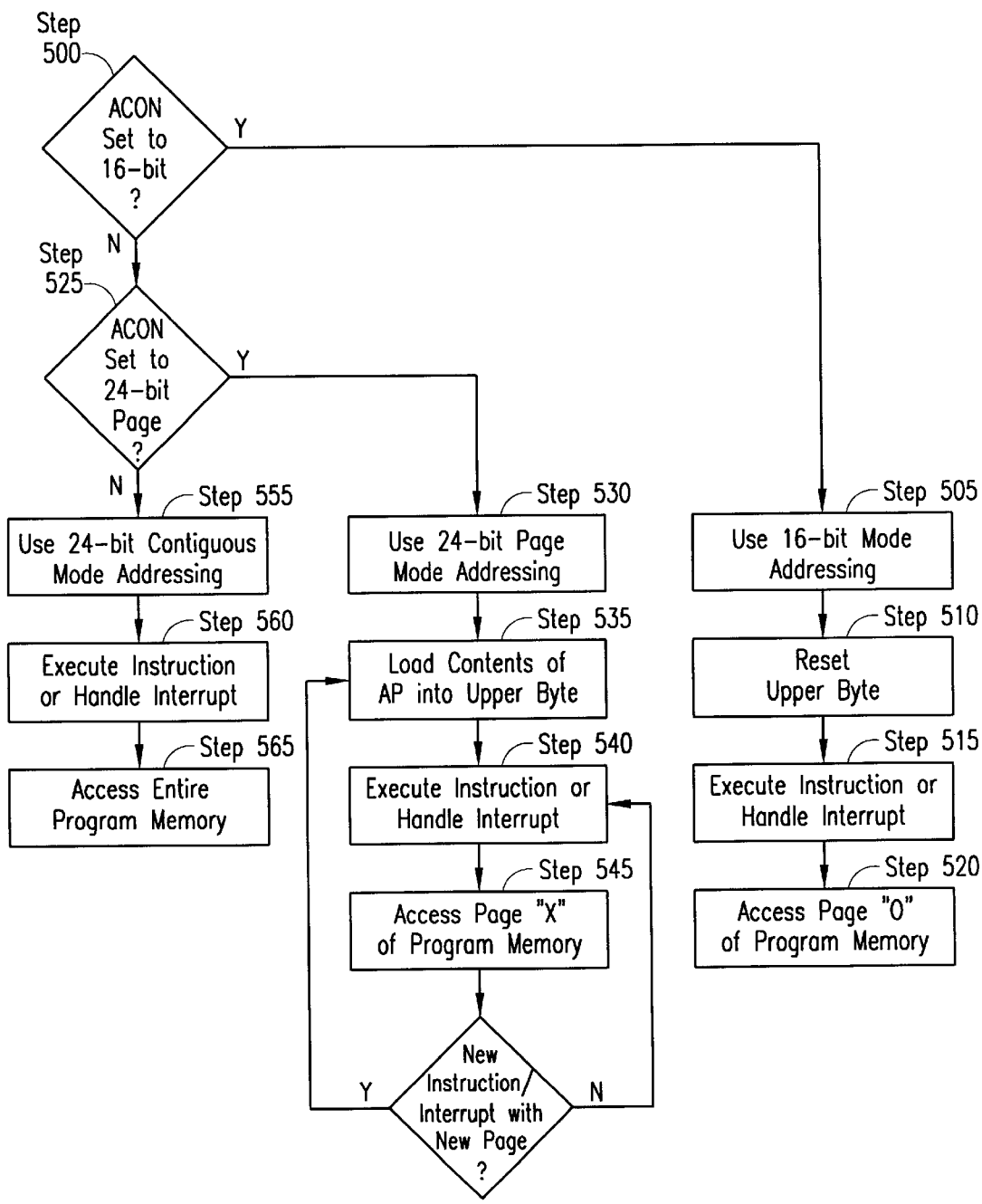
FIG. 3A is a flow chart illustrating the steps for 24-bit program memory addressing.

Referring now to FIG. 3A, the steps for performing 24-bit program memory addressing are shown. As mentioned above, the ACON register determines the chip address mode to allow the 8051 microcontroller to operate in either the traditional 16-bit address mode, a 24-bit paged address mode or in a 24-bit contiguous address mode. If the ACON register is set to 16-bit addressing mode (steps 500 and 505), which is the default address mode after a reset, the upper byte of the Program Counter (address bits 23-16) is forced to 00h (step 510), and remains reset during all instruction executions (step 515). The AP register has no function in the 16-bit addressing mode. With the upper byte of the Program Counter set to 00h, only page "0" (e.g., the first 64 K byte page) of the program memory is accessed to execute the instruction (step 520).

However, if the ACON register is set to 24-bit paged mode (steps 525 and 530), the contents of the AP register are loaded into the upper byte of the Program Counter (step 535) before executing an LJMP or LCALL instruction or before handling an interrupt request (step 540) (hereinafter, all instructions and interrupts will be referred to collectively as instructions). Thereafter, the instruction is executed by accessing the page of the program memory indicated by the upper byte of the program counter (step 545). If a new instruction is received involving another page of the program memory (step 550), a new address is written to the AP register, and this new address is loaded into the upper byte of the Program Counter (step 535) before execution of the new instruction (step 540). Again, the new instruction is executed in the page of program memory indicated by the upper byte of the Program Counter (step 545).

Finally, if the ACON register is set to 24-bit contiguous mode (step 555), the instruction is executed using the full 24-bit contiguous address range (step 560), in which the entire program memory is fully accessible (step 565). In the contiguous mode, the AP register has no function, and may be used as a spare register.

Figure 3B:
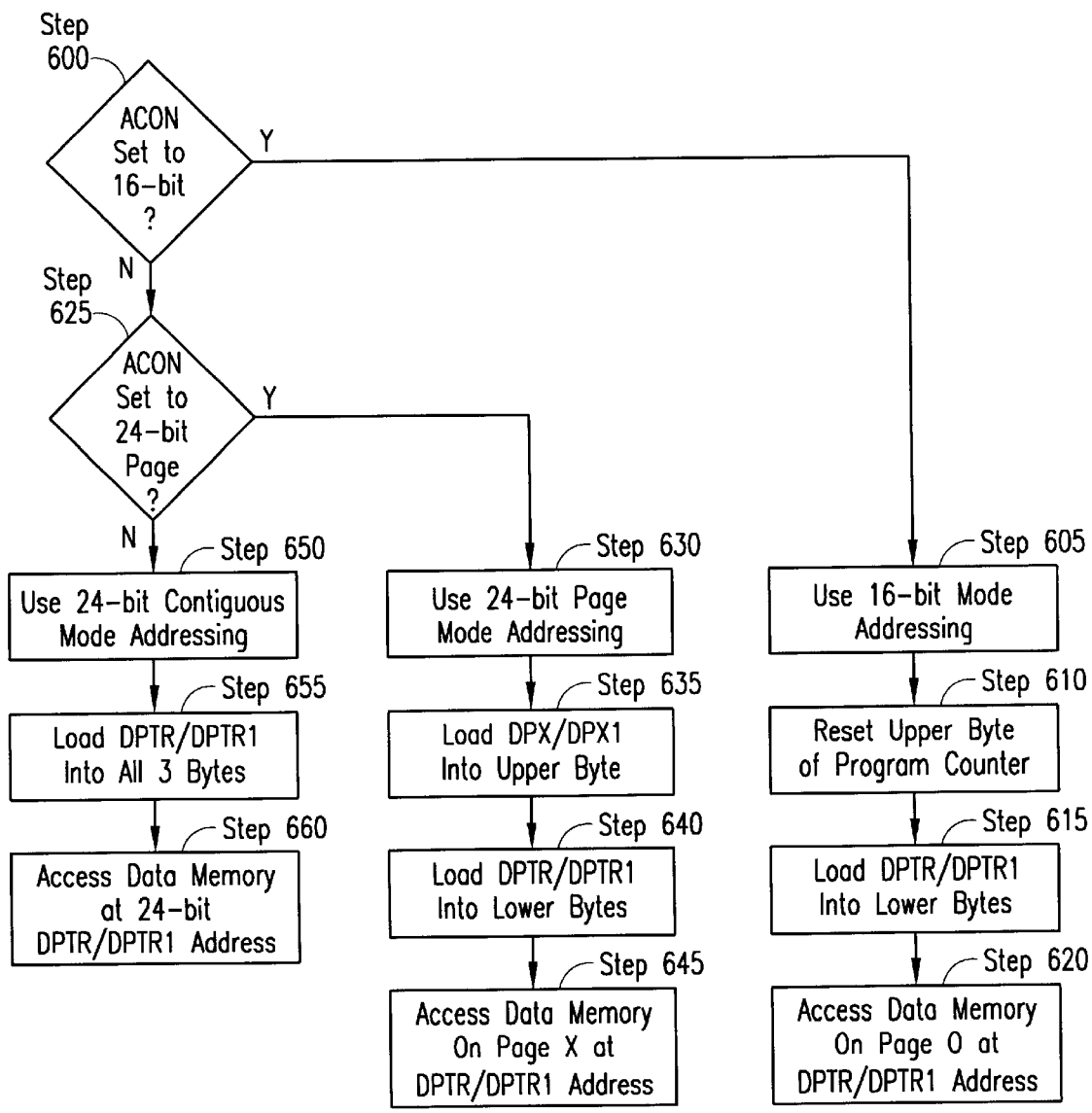
FIG. 3B is a flow chart illustrating the steps for 24-bit data memory addressing.

Referring now to FIG. 3B of the drawings, the steps for performing 24-bit data memory addressing are shown. In data addressing, if the ACON register is set to 16-bit addressing mode (steps 600 and 605), the upper byte of the Program Counter is reset to 00h (step 610). The DPX and DPX1 registers have no function in the 16-bit addressing mode. Thereafter, the contents of the 16-bit DPTR or DPTR1 register are loaded into the lower bytes of the Program Counter (step 615) to access the data memory on Page "0" at the DPTR or DPTR1 address (step 620).

However, if the ACON register is set to 24-bit paged mode addressing (steps 625 and 630), the contents of the DPX or DPX1 are loaded into the upper byte of the Program Counter to select the page (64K range) of data memory to access (step 635). In addition, the contents of the DPTR or DPTR1 register are loaded into the lower bytes of the Program Counter (step 640) to access the data at the 16-bit DPTR or DPTR1 address within the selected page (step 645). Finally, if the ACON register is set to 24-bit contiguous mode addressing (step 650), the contents of the 24-bit DPTR or DPTR1 register are loaded into all three bytes of the Program Counter (step 655) to access the full 24-bit data memory address (step 660). In contiguous mode, the DPX and DPX1 registers are included as part of the 24-bit DPTR and DPTR1 registers.

Figure 4A:
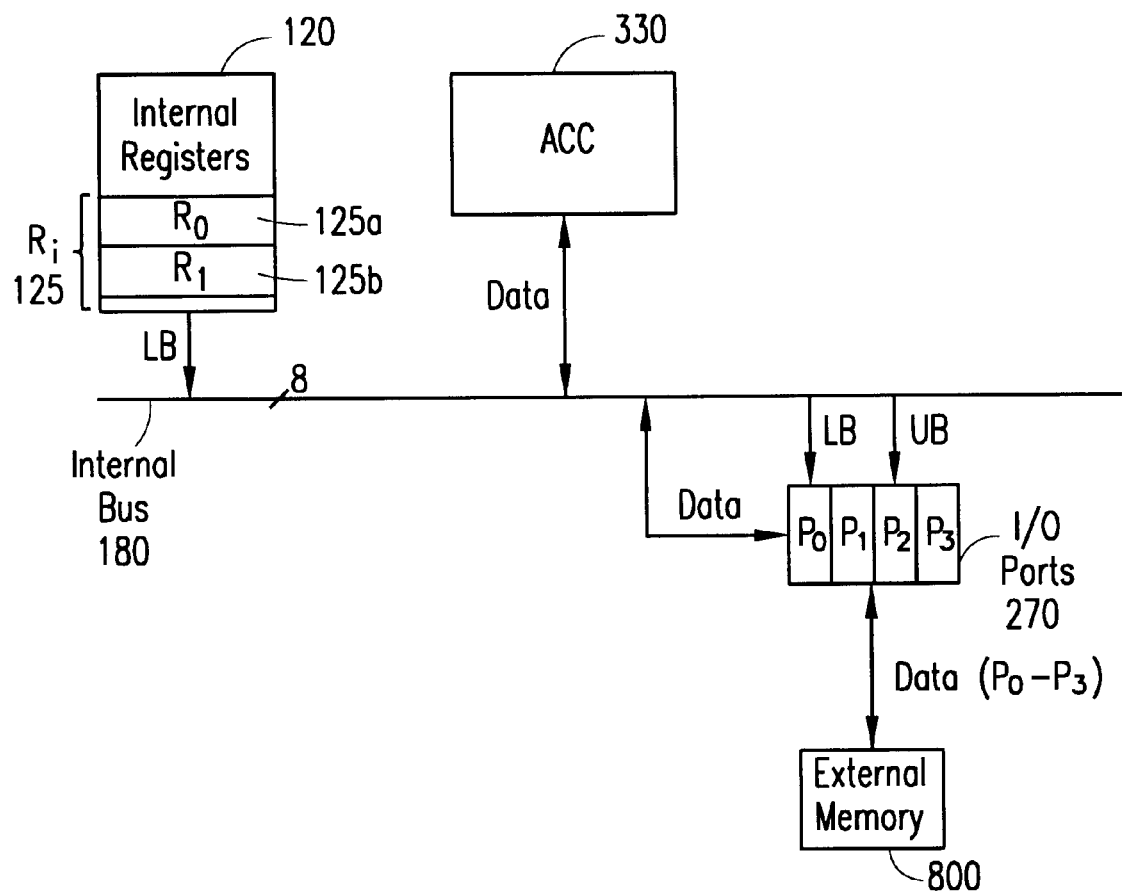
FIG. 4A is a functional block diagram illustrating memory accessing in 16-bit mode.

Referring now to FIG. 4A, there are two instructions (MOVX A, @$R_1$ and MOVX @ $R_1$, A) in the standard 8051 instruction set that use an external port 270 to provide the extended address (upper 8 bits of a full 16-bit address) to complement the lower 8 bits provided by the indirect addressing of the $R_1$ register 125. Within the Internal Registers 120 is a bank of eight working registers (R0–R7), and $R_1$ refers to R0 125a or R1 125b. When the $R_i$ register 125 is indirectly addressed, the contents of the $R_i$ register 125 are moved over the Internal bus 180 to the Port 0 register of the I/O Ports 270 to provide the lower byte (LB) of a 16-bit external address. The upper byte (UB) is manually loaded onto the Port 2 register of the I/O Ports 270 from the Internal bus 180. The 16-bit address (LB and UB) is used to access External Memory 800 to move data between the Accumulator (ACC) 330 and External Memory 800.

Figure 4B:
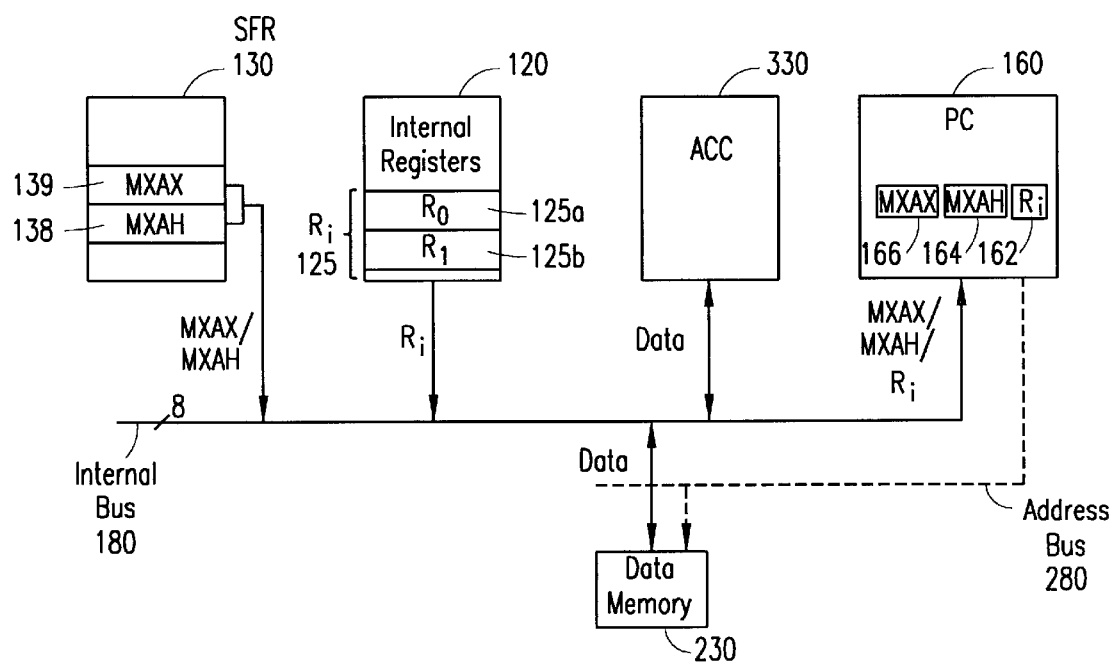
FIG. 4B is a functional block diagram illustrating memory accessing in 24-bit mode.

However, 24-bit addressing does not support external ports that can be used to store addresses with these instructions. Therefore, as shown in FIG. 4B, to provide the full address range from A0 to A21, the SFR 130 includes two additional move registers, MXAX 139 and MXAH 138, that function in the same way that the port bits do in the standard 8051 instruction set. Instead of accessing external memory, the MXAX 139 and MXAH 138 registers function to make accessible the full 16M of data 230 address space when executing the indirected @R₁ related MOVX instructions.

Therefore, when an indirect @Rᵢ related MOVX instruction is received by the microcontroller, the contents of the MXAX 139, MXAH 138 and R₁ 125 registers are sent over the Internal Bus 180 to the Program Counter 160, which loads the contents of the MXAX 139 and MXAH 138 registers into the upper two bytes 166 and 164, respectively, of the Program Counter 160 and the contents of the Rᵢ register 125 into the lowest byte 162 of the Program Counter 160. The Program Counter 160 uses this address to access the data 230 memory and move data between the data 230 memory and the Accumulator 330. It should be understood that the MXAX 139 and MXAH 138 SFRs are not used by any of the DPTR-related MOVX instructions. The MXAX 139 and MXAH 138 SFRs provide the upper 16 address bits 166 and 164, respectively, for a MOVX @Rᵢ, A or a MOVX A, @ R₁ instruction in the 24-bit addressing mode. It should further be understood that the MXAX 139 register is not used for addressing the data memory 230 in the 16-bit addressing mode, and can therefore be utilized as a scratchpad register in 16-bit addressing mode.

Figure 5A:
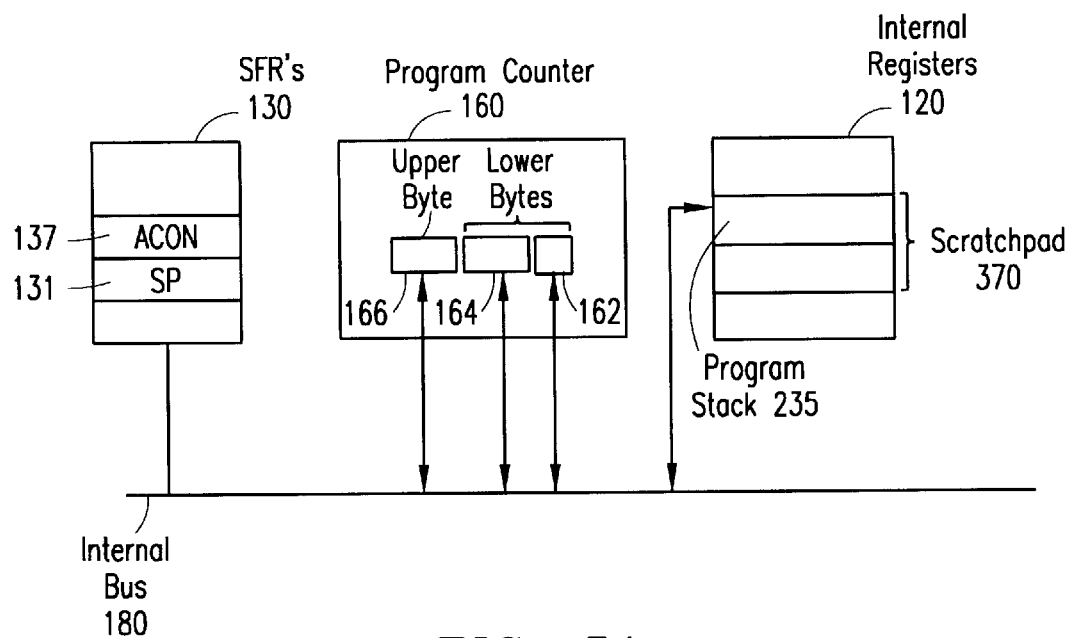
FIG. 5A is a functional block diagram illustrating the implementation of an 8-bit Stack Pointer.
Figure 5B:
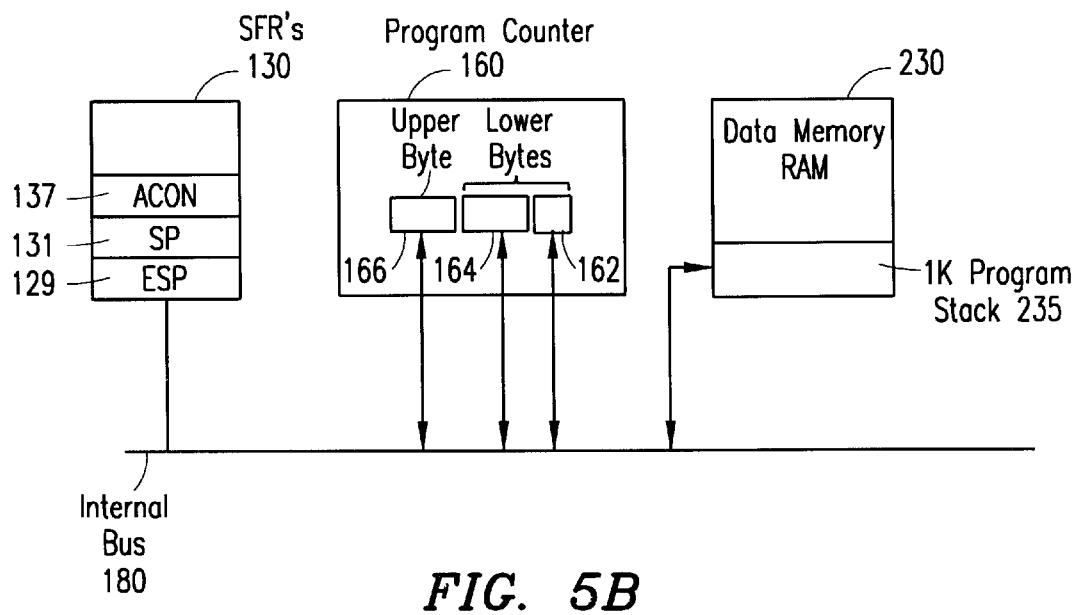
FIG. 5B is a functional block diagram illustrating the implementation of a 10-bit Stack Pointer.

Referring now to FIGS. 5A and 5B, the microcontroller with 24-bit addressing supports two stack options: (1) an 8-bit Stack Pointer to address a stack size of 256 bytes that are located in the Scratchpad RAM area; or (2) an Extended Stack Pointer to address the program stack located in the internal data memory area. FIG. 5A illustrates the 8-bit Stack Pointer, while FIG. 5B illustrates the Extended Stack Pointer.

As shown in FIG. 5A, when the ACON register 137 is set to operate with the 8-bit Stack Pointer 131, the Program Stack 375 is located in the 256 bytes of stack storage in the Scratchpad RAM 370 of the Internal Registers 120. This mode of operation is identical to the standard 8051. It should be noted that the value of the extended stack pointer (ESP) 129 shown in FIG. 5B has no effect in the 8-bit Stack Pointer mode of operation.

As can further be ascertained from FIG. 5A, in 8-bit Stack Pointer mode, when an interrupt or ACALL or LCALL instruction is received, the Program Counter 160 pushes the two or three bytes, depending on the addressing mode, of the Program Counter 160 onto the Program Stack 375 via the Internal Bus 180, and the Stack Pointer (SP) register 131 is updated with the address in the Program Stack 375 associated with the highest byte 164 or 166 loaded by the Program Counter 160. Upon a return, the Stack Pointer 131 is used by the Program Counter 160 to retrieve the last address loaded onto the Program Stack 375. The highest byte 164 or 166 is retrieved first, and the Stack Pointer 131 is decremented by one to retrieve the next lower byte 162 or 164 that was pushed onto the Program Stack 375. This process is repeated until all bytes of the Program Counter 160 are retrieved.

As shown in FIG. 5B, in Extended Stack Pointer mode, the 8-bit Stack Pointer (SP) register 131 is extended by an Extended Stack Pointer (ESP) register 129, and both combined are capable of being accessed during interrupts, ACALL, LCALL, RET, RETI, PUSH and POP instructions. The combined SP 131 and ESP 129 can address at least 1 K bytes of Program Stack memory 235 within the data memory 230. In some embodiments, the SP value is a combination of the 8 bits of the SP register 131 and the additional two least significant bits of the ESP register 129. However, in other embodiments, the SP value may be a combination of the 8 bits of the SP register and any or all of the bits of the ESP register 129. The Extended Stack Pointer mode can be used in any addressing mode. When in the Extended Stack Pointer mode, the 256 bytes of Program Stack memory 375 in the Scratchpad 370 can be used as additional memory space.

During stack operations, any overflow of the SP register 131 from FFh to 00h will increment the ESP 129 by 1. In addition, any underflow of the SP 131 from 00h to FFh will decrement the ESP 129 by 1. Values larger than the specified stack range will rollover to 000h and potentially overwrite existing stack locations. It should be noted that changing the stack mode between 8-bit and Extended effectively changes the stack memory to a different storage area.

Figure 6:
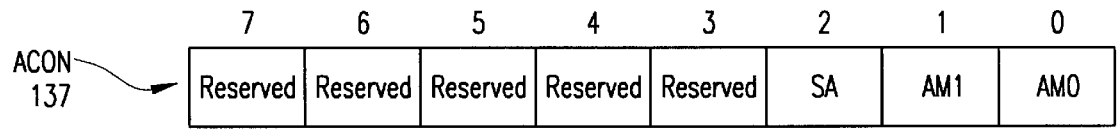
FIG. 6 illustrates the bits in the ACON SFR.

FIG. 6 illustrates the bits in the ACON SFR 137. The ACON SFR 137 is an unrestricted read SFR. However, in some embodiments, the ACON SFR 137 requires timed access for write operations. Bits 0 and 1 are referred to as the Address Mode 0 (AM0) and Address Mode 1 (AM1) bits, respectively. The setting of the AM0 and AM1 bits determines the chip address mode. In some embodiments, the AM0 and AM1 bits set the address mode, as follows:

| AM1 | AM0 | Addressing Mode |
| --- | --- | --- |
| 0 | 0 | 16-bit address mode (default) |
| 0 | 1 | 24-bit paged mode |
| 1 | 0 | 24-bit contiguous mode |
| 1 | 1 | 24-bit contiguous mode. |

The Stack Address (SA) bit sets the Stack Pointer to either the 8-bit mode or Extended mode. In some embodiments, when the SA bit is cleared to a logic 0, the stack is addressed using the 8-bit SP, and is operated in the 256 bytes Scratchpad region. When the SA bit is set to a logic 1, the stack is addressed using the 10-bit SP, and is operated in the 1K internal RAM. Bits 3–7 are shown as reserved.

Figure 7:
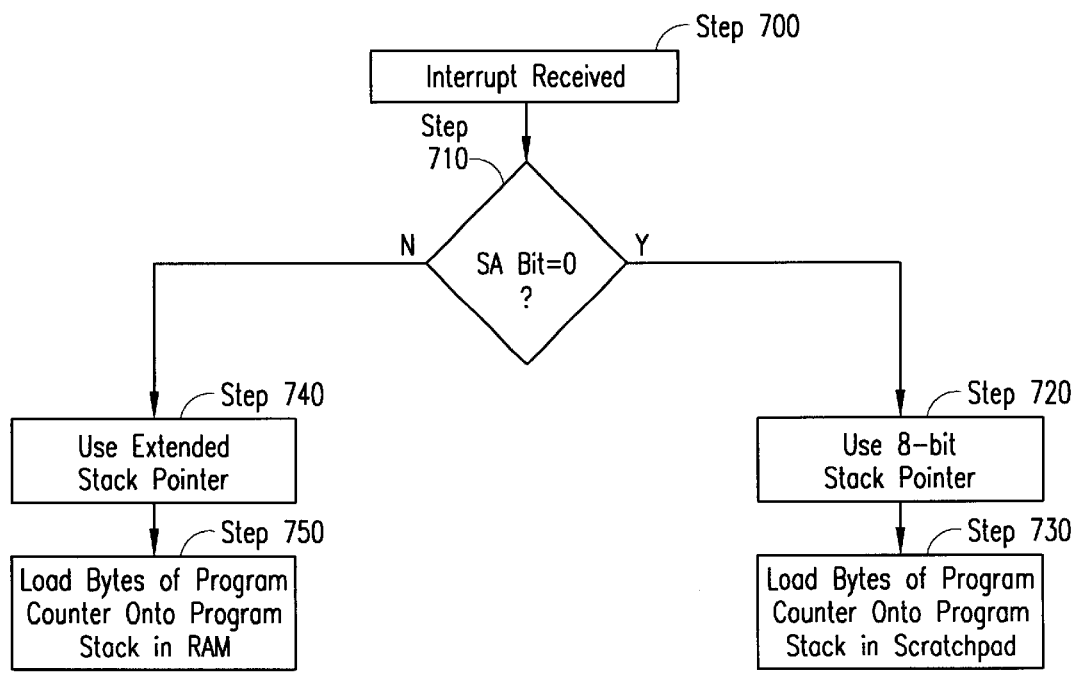
FIG. 7 is a flow chart illustrating an Interrupt using the Stack Pointers of FIGS. 5A and 5B.

FIG. 7 is a flow chart illustrating an Interrupt using the Stack Pointers of FIGS. 5A and 5B. As shown in FIGS. 5A and 5B, the 8-bit microcontroller of the present invention incorporates hardware that supports interrupts from any location in the 24-bit address field. When an interrupt request is acknowledged (step 700), the SA bit of the ACON register is checked. If the SA bit is set to 0 (step 710), the 8-bit Stack Pointer is used (step 720) and the current contents of the Program Counter are pushed onto the Program Stack in the Scratchpad (step 730). However, if the SA bit is set to 1 (step 710), the Extended Stack Pointer is used (step 740), and the current contents of the Program Counter (step 750) are pushed onto the Program stack in the 1K data memory RAM.

As is known in the art, to process the interrupt, the address value of the interrupt vector is written to the Program Counter by the interrupt circuits before the execution of the instruction. The RETI (return) instruction pops the two or three address bytes from the Program Stack (depending upon the addressing mode), and loads those bytes back to the Program Counter at the conclusion of the interrupt service routine.

Although the present invention is open to various modifications and alternative constructions, a preferred exemplary embodiment that is shown in the drawings is described herein above in detail. It is to be understood, however, that there is no intention to limit the invention to the particular forms and/or step sequences disclosed.

What is claimed is:

1. An 8-bit microcontroller having extended addressing capability, comprising:

an address control special function register capable of being set to one of three address modes, a first address mode being a 16-bit address mode, a second address mode being a 24 bit paged address mode and a third address mode being a 24-bit contiguous address mode;

at least one internal memory;

a program counter having three bytes;

a 24 bit address bus for accessing said at least one internal memory in any of said three address modes and an address page special function register being manually written to prior to execution of an instruction, wherein the contents of said address page special function register are loaded into an upper byte of said three bytes of said program counter prior to execution of the instruction, said upper byte pointing to a page of said at least one internal memory.

2. The 8-bit microcontroller of claim 1, wherein said at least one memory is a 16M program memory, said page being a 64K page of said 16M program memory, and wherein lower bytes of said three bytes of said program counter point to a 16 bit address within said 64K page.

3. The 8-bit microcontroller of claim 1, wherein said upper byte of said program counter is not incremented when lower bytes of said three bytes of said program counter roll over from FFFFh to 0000h.

4. The 8-bit microcontroller of claim 1, wherein said program counter is capable of incrementing and decrementing said three bytes together in response to execution of an instruction, said three bytes pointing to a 24-bit address within said at least one memory.

5. The 8-bit microcontroller of claim 4, wherein said 8 bit microcontroller is an 8051 compatible microcontroller running a modified 8051 instruction set, each modified instruction within said modified 8051 instruction set having an opcode identical to an original respective 8051 instruction and containing an additional byte over said original respective 8051 instruction and/or requiring an additional cycle to complete over said original respective 8051 instruction.

6. The 8-bit microcontroller of claim 1, further comprising:

an 8-bit low data pointer special function register;

an 8-bit high data pointer special function register; and an 8-bit extended data pointer special function register.

7. The 8-bit microcontroller of claim 6, wherein the contents of said 8-bit extended data pointer special function register are loaded into an upper byte of said three bytes of said program counter and the contents of said 8-bit high data pointer special function register and said 8-bit low data pointer special function register are loaded into lower bytes of said three bytes of said program counter prior to execution of an instruction, said upper byte pointing to a page of said at least one internal memory.

8. The 8-bit microcontroller of claim 7, wherein said at least one internal memory is a 16M data memory, said page being a 64K page of said 16M data memory, said lower bytes pointing to a 16-bit address within said 64K page.

9. The 8-bit microcontroller of claim 6, wherein the contents of said 8-bit high data pointer special function register, said 8-bit low data pointer special function register and said extended data pointer special function register are loaded into said three bytes of said program counter prior to execution of an instruction, said three bytes pointing to a 24-bit address within said at least one memory.

10. The 8-bit microcontroller of claim 1, wherein said address control special function register is further capable of being set to one of two stack pointer modes, a first stack pointer mode being an 8-bit stack pointer mode, a second stack pointer mode being an extended stack pointer mode, and wherein said at least one internal memory includes a first internal memory and a second internal memory, and further comprising:

a Program Stack being adapted to store at least two of said three bytes of said program counter, said Program Stack being located in said first internal memory when said address control special function register is set to said 8-bit stack pointer mode, and being located in said second internal memory when said address control special function register is set to said extended stack pointer mode.

11. The 8-bit microcontroller of claim 10, further comprising:

a stack pointer special function register being used when said address control special function register is set to 8-bit stack pointer mode; and an extended stack pointer special function register, said stack pointer special function register and said extended stack pointer special function register being used when said address control special function register is set to said extended stack pointer mode.

12. The 8-bit microcontroller of claim 10, wherein said first internal memory is a 256 byte memory within a scratchpad memory area and said second internal memory is at least a 1K memory within a data memory area.

13. The 8-bit microcontroller of claim 1, further comprising:

an indirect register;

a first move special function register; and a second move special function register;

wherein the contents of said indirect register, said first move special function register and said second move special function register are loaded into respective ones of said three bytes of said program counter in response to receiving an indirect data movement instruction.

14. An 8-bit microcontroller operating in a 24-bit paged addressing mode, comprising:

an address page special function register being manually written to prior to execution of an instruction;

a program counter having three bytes, the contents of said address page special function register being loaded into an upper byte of said three bytes prior to execution of the instruction;

at least one internal memory, said upper byte pointing to a page of said at least one internal memory; and a 24-bit address bus for accessing said page of said at least one internal memory in response to execution of the instruction.

15. The 8-bit microcontroller of claim wherein said at least one memory is a 16M program memory, said page being a 64K page of said 16M program memory, and wherein lower bytes of said three bytes of said program counter point to a 16-bit address within said 64K page.

16. The 8-bit microcontroller of claim wherein said upper byte of said program counter is not incremented when lower bytes of said three bytes of said program counter roll over from FFFFh to 0000h.

17. The 8-bit microcontroller of claim 14, wherein said 8-bit microcontroller is an 8051 compatible microcontroller running an 8051 compatible instruction set, at least one instruction within said 8051 compatible instruction set requiring an additional cycle to complete over an original respective 8051 instruction.

18. The 8-bit microcontroller of claim 14, further comprising:
   an 8-bit low data pointer special function register;
   an 8-bit high data pointer special function register; and
   an 8-bit extended data pointer special function register.

19. The 8-bit microcontroller of claim 18, wherein the contents of said 8-bit extended data pointer special function register are loaded into an upper byte of said three bytes of said program counter and the contents of said 8-bit high data pointer special function register and said 8-bit low data pointer special function register are loaded into lower bytes of said three bytes of said program counter prior to execution of an instruction, said upper byte pointing to a page of said at least one internal memory.

20. The 8-bit microcontroller of claim 19, wherein said at least one internal memory is a 16M data memory, said page being a 64K page of said 16M data memory, said lower bytes pointing to a 16-bit address within said 64K page.

21. An 8-bit microcontroller operating in a 24-bit contiguous addressing mode, comprising:
   a program counter having three bytes, said program counter being capable of incrementing and decrementing said three bytes together in response to execution of an instruction;
   at least one internal memory, said three bytes pointing to a 24-bit address within said at least one memory; and
   a 24-bit address bus for accessing said at least one internal memory during execution of the instruction and;
   wherein said 8-bit microcontroller is an 8051 compatible microcontroller running a modified 8051 instruction set, each modified instruction within said modified 8051 instruction set having an opcode identical to an original respective 8051 instruction and containing an additional byte over said original respective 8051 instruction and/or requiring an additional cycle to complete over said original respective 8051 instruction.

22. The 8-bit microcontroller of claim 21, further comprising:
   an 8-bit low data pointer special function register;
   an 8-bit high data pointer special function register; and
   an 8-bit extended data pointer special function register.

23. The 8-bit microcontroller of claim 22, wherein the contents of said 8-bit high data pointer special function register, said 8-bit low data pointer special function register and said extended data pointer special function register are loaded into said three bytes of said program counter prior to execution of an instruction, said three bytes pointing to a 24-bit address within said at least one memory.

24. The 8-bit microcontroller of claim 21, wherein said at least one internal memory includes a 16M data memory and a 1GM program memory.

25. An 8-bit microcontroller capable of providing 24-bit addressing, comprising:
   an address control special function register capable of being set to one of two stack pointer modes, a first stack pointer mode being an 8-bit stack pointer mode, a second stack pointer mode being an extended stack pointer mode;
   a first internal memory capable of supporting a Program Stack, said Program Stack being located in said first internal memory when said address control special function register is set to said 8-bit stack pointer mode; and
   a second internal memory capable of supporting said Program Stack, said Program Stack being located in said second internal memory when said address control special function register is set to said extended stack pointer mode.

26. The 8-bit microcontroller of claim 25, further comprising:
   a program counter having three bytes, said Program Stack being adapted to store at least two of said three bytes of said program counter.

27. The 8-bit microcontroller of claim 25, further comprising:
   a stack pointer special function register being used when said address control special function register is set to 8-bit stack pointer mode; and
   an extended stack pointer special function register, said stack pointer special function register and said extended stack pointer special function register being used when said address control special function register is set to said extended stack pointer mode.

28. The 8-bit microcontroller of claim 25, wherein said first internal memory is a 256 byte memory within a scratchpad memory area and said second internal memory is at least a 1K memory within a data memory area.

29. A method for providing extended addressing capability to an 8-bit microcontroller, comprising:
   providing a program counter having three bytes;
   setting an address control special function register to one of three address modes, a first address mode being a 16-bit address mode, a second address mode being a 24-bit paged address mode and a third address mode being a 24-bit contiguous address mode;
   accessing at least one internal memory via a 24-bit address bus in any of said three address modes;
   receiving an instruction;
   writing to an address page special function register prior to execution of said instruction; and
   loading the contents of said address page special function register into an upper byte of said three bytes of said program counter prior to execution of said instruction, said upper byte pointing to a page of said at least one internal memory.

30. The method of claim 29, wherein said at least one memory is a 16M program memory, said page being a 64K page of said 16M program memory, and wherein lower bytes of said three bytes of said program counter point to a 16-bit address within said 64K page.

31. The method of claim 29, further comprising:
   executing said instruction, said upper byte of said program counter not being incremented when lower bytes of said three bytes of said program counter roll over from FFFFh to 0000h.

32. The method of claim 29, further comprising:
receiving an instruction; and
executing said instruction, said three bytes of said program counter being incremented and decremented together during execution of said instruction, said three bytes pointing to a 24-bit address within said at least one memory.

33. The method of claim 32, wherein said 8-bit microcontroller is an 8051 compatible microcontroller, and further comprising:
running a modified 8051 instruction set, each modified instruction within said modified 8051 instruction set having an opcode identical to an original respective 8051 instruction and containing an additional byte over said original respective 8051 instruction and/or requiring an additional cycle to complete over said original respective 8051 instruction.

34. The method of claim 29, further comprising:
providing an 8-bit low data pointer special function register;
providing an 8-bit high data pointer special function register; and
providing an 8-bit extended data pointer special function register.

35. The method of claim 34, further comprising:
receiving an instruction;
loading the contents of said 8-bit extended data pointer special function register into an upper byte of said three bytes of said program counter; and
loading the contents of said 8-bit high data pointer special function register and said 8-bit low data pointer special function register into lower bytes of said three bytes of said program counter prior to execution of said instruction, said upper byte pointing to a page of said at least one internal memory.

36. The method of claim 35, wherein said at least one internal memory is a 16M data memory, said page being a 64K page of said 16M data memory, said lower bytes pointing to a 16-bit address within said 64K page.

37. The method of claim 34, further comprising:
receiving an instruction; and
loading the contents of said 8-bit high data pointer special function register, said 8-bit low data pointer special function register and said extended data pointer special function register into said three bytes of said program counter prior to execution of said instruction, said three bytes pointing to a 24-bit address within said at least one memory.

38. The method of claim 29, wherein said at least one internal memory includes a first internal memory and a second internal memory, and further comprising:
setting said address control special function register to one of two stack pointer modes, a first stack pointer mode being an 8-bit stack pointer mode, a second stack pointer mode being an extended stack pointer mode;
providing a Program Stack for storing at least two of said three bytes of said program counter within said first internal memory when said address control special function register is set to said 8-bit stack pointer mode; and
providing said Program Stack within said second internal memory when said address control special function register is set to said extended stack pointer mode.

39. The method of claim 38, further comprising:
providing a stack pointer special function register;
providing an extended stack pointer special function register;
using only said stack pointer special function register when said address control special function register is set to 8-bit stack pointer mode; and
using both said stack pointer special function register and said extended stack pointer special function register when said address control special function register is set to said extended stack pointer mode.

40. The method of 38, wherein said first internal memory is a 256 byte memory within a scratchpad memory area and said second internal memory is at least a 1K memory within a data memory area.

41. The method of claim 29, further comprising:
providing an indirect register, a first move special function register and a second move special function register;
loading the contents of said indirect register, said first move special function register and said second move special function register into respective ones of said three bytes of said program counter in response to receiving an indirect data movement instruction.

42. A method for operating an 8-bit microcontroller in a 24-bit paged addressing mode, comprising:
manually writing to an address page special function register prior to execution of an instruction;
loading the contents of said address page special function register into an upper byte of a program counter having three bytes prior to execution of the instruction, said upper byte pointing to a page of at least one internal memory; and
accessing said page of said at least one internal memory via a 24-bit address bus in response to execution of the instruction.

43. The method of claim 42, wherein said at least one memory is a 16M program memory, said page being a 64K page of said 16M program memory, and wherein lower bytes of said three bytes of said program counter point to a 16-bit address within said 64K page.

44. The method of claim 42, further comprising:
executing the instruction, said upper byte of said program counter not being incremented when lower bytes of said three bytes of said program counter roll over from FFFFh to 0000h.

45. The method of claim 42, wherein said 8-bit microcontroller is an 8051 compatible microcontroller and further comprising:
running an 8051 compatible instruction set, at least one instruction within said 8051 compatible instruction set requiring an additional cycle to complete over an original respective 8051 instruction.

46. The method of claim 42, further comprising:
providing an 8-bit low data pointer special function register;
providing an 8-bit high data pointer special function register; and
providing an 8-bit extended data pointer special function register.

47. The method of claim 46, further comprising:
loading the contents of said 8-bit extended data pointer special function register into an upper byte of said three bytes of said program counter; and
loading the contents of said 8-bit high data pointer special function register and said 8-bit low data pointer special function register into lower bytes of said three bytes of said program counter prior to execution of an additional instruction, said upper byte pointing to a page of said at least one internal memory.

48. The method of claim 47, wherein said at least one internal memory is a 16M data memory, said page being a 64K page of said 16M data memory, said lower bytes pointing to a 16-bit address within said 64K page.

49. A method for operating an 8-bit microcontroller in a 24-bit contiguous addressing mode, comprising:

providing a program counter having three bytes, said program counter being capable of incrementing and decrementing said three bytes together in response to execution of an instruction, said three bytes pointing to a 24-bit address within at least one memory; accessing said at least one internal memory via a 24-bit address bus during execution of the instruction and;

wherein said 8-bit microcontroller is an 8051 compatible microcontroller and further comprising:

running a modified 8051 instruction set, each modified instruction within said modified 8051 instruction set having an opcode identical to an original respective 8051 instruction and containing an additional byte over said original respective 8051 instruction and/or requiring an additional cycle to complete over said original respective 8051 instruction.

50. The method of claim 49, further comprising:

providing an 8-bit low data pointer special function register;

providing an 8-bit high data pointer special function register; and providing an 8-bit extended data pointer special function register.

51. The method of claim 50, further comprising:

loading the contents of said 8-bit high data pointer special function register, said 8-bit low data pointer special function register and said extended data pointer special function register into said three bytes of said program counter prior to execution of an additional instruction, said three bytes pointing to a 24-bit address within said at least one memory.

52. The method of claim 49, wherein said at least one internal memory includes a 16M data memory and a 16M program memory.

53. A method of providing 24-bit addressing within an 8-bit microcontroller, comprising:

setting an address control special function register to one of two stack pointer modes, a first stack pointer mode being an 8-bit stack pointer mode, a second stack pointer mode being an extended stack pointer mode;

providing a Program Stack within a first internal memory when said address control special function register is set to said 8-bit stack pointer mode; and providing a Program Stack within a second internal memory when said address control special function register is set to said extended stack pointer mode.

54. The method of claim 53, further comprising:

providing a program counter having three bytes; and storing at least two of said three bytes of said program counter within said Program Stack.

55. The method of claim 53, further comprising:

using a stack pointer special function register when said address control special function register is set to 8-bit stack pointer mode; and using said stack pointer special function register and an extended stack pointer special function register when said address control special function register is set to said extended stack pointer mode.

56. The method of claim 53, wherein said first internal memory is a 256 byte memory within a scratchpad memory area and said second internal memory is at least a 1K memory within a data memory area.

* * * * *